United States Patent Office 3,213,929
Patented Oct. 26, 1965

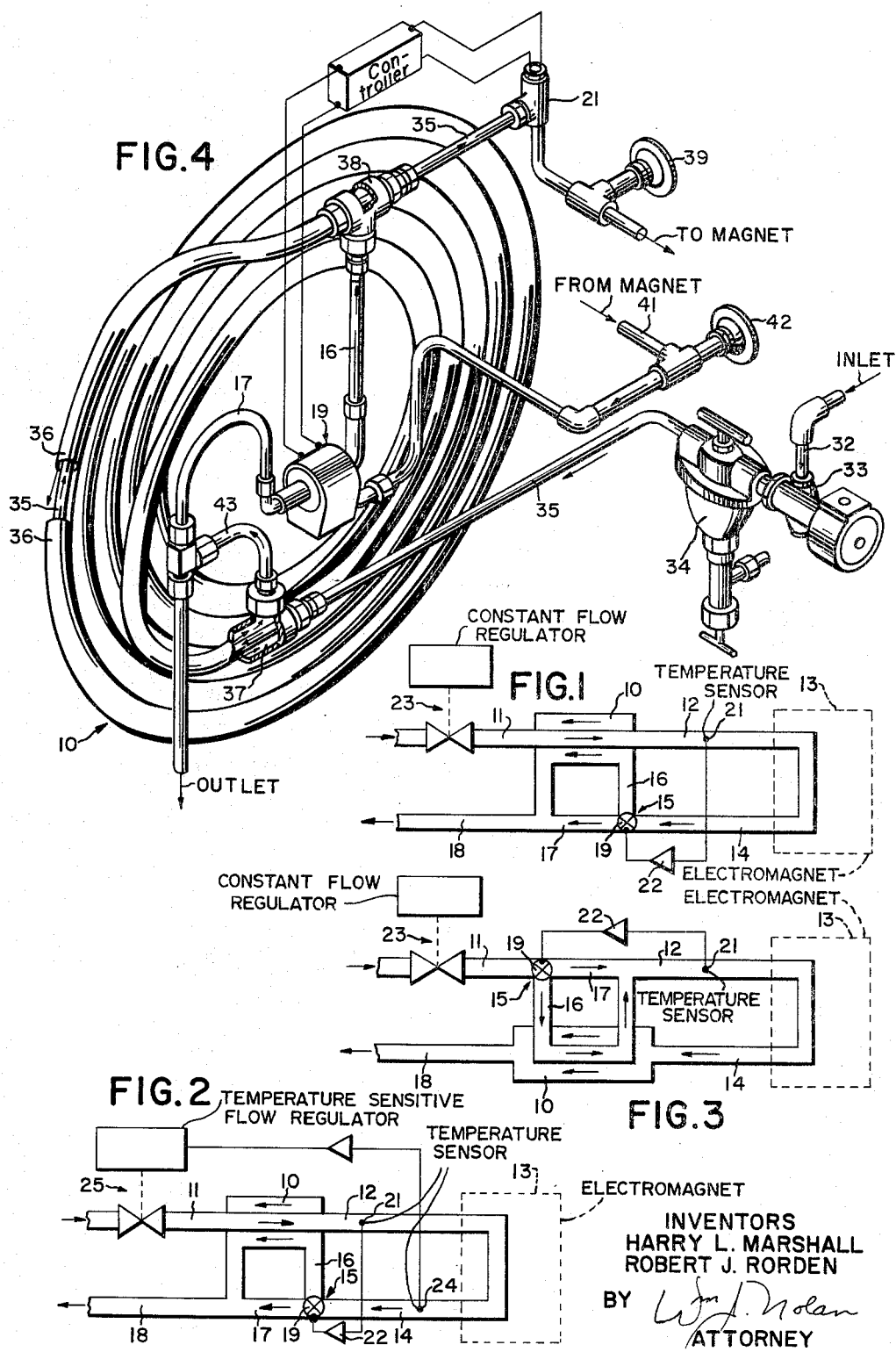

3,213,929
TEMPERATURE CONTROL SYSTEM
Harry L. Marshall, Menlo Park, and Robert J. Rorden, Palo Alto, Calif., assignors to Varian Associates, Palo Alto, Calif., a corporation of California
Filed Feb. 12, 1962, Ser. No. 172,424
7 Claims. (Cl. 165—35)

This invention relates in general to temperature control systems and, more particularly, to an improved, compact, and economical flowing fluid temperature control system useful, for example, in the temperature stabilization of precision electromagnets.

A severe problem encountered in the use of large electromagnets when an extremely high degree of stability and field homogeneity must be maintained, as in the case of electromagnets used in nuclear magnetic resonance appartaus, is that any variation in the size of the air gap effects appreciable changes in field intensity and homogeneity. The size of the air gap is affected by thermal expansion of the electromagnet and therefore greater stability in magnet temperature will provide greater stability in the magnetic field.

In the past, such magnets have been maintained at a proper operating temperature by cooling the magnet windings and associated structure with a flowing fluid such as water, the cooling fluid being provided by a closed-loop fluid system. The fluid was passed through a heat exchanger where heat was extracted, as required, from the cooling fluid by a second fluid loop.

An object of this invention is to provide an improved compact, economical, single loop fluid flow temperature control system for use, for example, with electromagnets.

One feature of this invention is the provision of a temperature control system which utilizes a heat exchanger for controllably transferring heat from the heated return fluid to the supply fluid to maintain a constant supply fluid temperature.

Another feature of this invention is the provision of a temperature control system of the above-featured type which includes a valve in the fluid input channel of the heat exchanger for regulating the flow of fluid between the heat exchanger and a bypass line.

Another feature of this invention is the provision of a temperature control system including two concentric spiral wound tubes forming a compact, economical heat exchanger, one of said tubes carrying supply fluid and the other return fluid whereby the supply fluid is maintained at a constant temperature by the return fluid.

Another feature of this invention is the provision of a temperature control system of the immediately preceding featured type including an automatic control valve in the return fluid tube for regulating the flow of the return fluid between the heat exchanger and a bypass line.

These and other features and advantages of the present invention will be more apparent after a perusal of the following specification taken in connection with the accompanying drawings wherein, FIG. 1 is a schematic piping diagram of one embodiment of the temperature control system of the present invention, FIG. 2 is a schematic piping diagram of another embodiment of the temperature control system, FIG. 3 is a schematic diagram of another embodiment of the temperature control system, and FIG. 4 depicts a temperature control system unit of the type shown in FIG. 1 which is employed to cool a large electromagnet as used in a nuclear magnetic resonance apparatus.

Referring now to FIG. 1, the temperature control system includes a heat exchanger or regenerator 10. The supply fluid, for example, water, flows into the heat exchanger 10 through an input line or tube 11 and out of the heat exchanger 10 into a line 12 to a device 13 to be cooled, for example, an electromagnet assembly of a nuclear magnetic resonance apparatus. The warm return fluid returns through line 14 to a T-branch 15 that has one branch line 16 connected to the heat exchanger 10 and another branch line 17 which bypasses the return fluid around the heat exchanger 10 directly to the outlet 18. It is thus seen that the main fluid line includes lines 11 and 12 and the section therebetween which is located in the heat exchanger 10, and lines 14, 16 and 18 and the line section between lines 16 and 18 which is also located in the heat exchanger 10. Line 17 forms a bypass line.

A fluid diverting valve 19 disposed within the T-branch 16 regulates the flow of the return fluid between lines 16 and 17. The valve 19 is automatically controlled by a temperature sensing means 21 such as a thermistor that produces a signal related to the temperature of the supply fluid. The electrical error signal from the thermistor 21, which is in one arm of a Wheatstone bridge in a controller circuit 22, controls the valve 19 to decrease the quantity of return fluid flowing through the bypass line 17 and increase the flow through line 16 as the temperature at the thermistor 21 decreases and vice versa, so that the temperature of the input fluid to load 13 remains constant. Valve 19 may be of the well known modulating type, such as a proportional valve, or the on-off type. The former will divide the return fluid flow between the heat exchanger 10 and the bypass 17 in relation to the temperature at the sensing means 21, and the latter will time proportion the return fluid flow between the heat exchanger and the bypass in relation to temperature. The valve 19 need not be of the type that is electrically controlled by the signal from thermistor 21, but one skilled in the art, for example, could adopt an automatic-mechanical control to control valve 19 with respect to the temperature of the supply fluid. A fluid mixing valve can be used, if desired, on the outlet side of the heat exchanger, in place of the valve 19, for diverting the fluid through the bypass line.

It is desirable that, in addition to maintaining the input fluid at a constant temperature, a constant temperature gradient be maintained between the input point of the magnet and the output. This feature will be obtained when the temperature control system is utilized with a constant heat source 13 if the flow rate of the fluid is maintained constant. For this reason, a constant flow regulator of known type is included in the flow line, for example, in the inlet line 11 as shown by reference numeral 23 in FIG. 1.

FIG. 2 discloses a temperature control system similar to FIG. 1 with the exception that it is more suitable for variable heat loads. Variations in the heat of load 13 will result in variations in total temperature difference between inlet and outlet points of the load 13. A temperature sensing element 24, such as a thermistor, is placed in the output line 14 to detect changes in fluid temperature, the output signal transmitted to a flow control means 25 which operates to increase the flow rate as the temperature at 24 increases above a desired set point and decreases as the temperature falls below the set point. Thus, not only inlet temperature to the load, but also load temperature gradient is maintained constant. It is, of course, obvious that the flow regulators shown in FIGS. 1 and 2 may be located at other desirable places in the system, for example in the output lines 18.

Referring to FIG. 3, there is shown an embodiment wherein the supply fluid flow is regulated between the heat exchanger 10 and the bypass line 17 before the supply fluid enters the heat load 13. Elements similar to those in FIG. 1 bear like-reference numerals and the operation of this embodiment is believed obvious from the above explanation of FIG. 1. This embodiment could also include a variable flow regulator as in the case of FIG. 2 for use with variable heat loads.

Referring to FIG. 4, there is shown one preferred embodiment of a temperature control system employing the principle taught in conjunction with FIG. 1. The cabinet which encloses the controller and the apparatus to be cooled is not shown in order to simplify the drawing. The supply fluid enters the unit through tubing 32 and passes into a combined flow regulator and on-off solenoid-controlled valve 33 that automatically turns on the flow of fluid when the magnet of the associated nuclear magnetic resonance apparatus is switched on. The supply fluid then passes through a filter 34 and tubing 35 into the heat exchanger 10.

The heat exchanger 10 comprises two concentric copper tubes, the inner tube 35 and an outer tube 36, spiral wound to form a compact flat heat exchanger which provides a large heat exchanger surface in a minimum of space. Fittings 37 and 38 are placed at the ends of the heat exchanger and serve to terminate the outer tubing 36.

The supply fluid from the heat exchanger 10 passes the thermistor 21, a thermometer 39, where an operator may observe the controlled temperature, and then enters the electromagnet where it serves to cool the magnet windings and associated structure. The return fluid from the magnet passes through tubing 41 past another thermometer 42 and into the valve 19. Valve 19 channels the fluid either through bypass line 17 or through the line 16 and fitting 38 into the outer tubing 36 of the heat exchanger. The return water that passes through the outer tubing 36 and around the inner tubing 35 serves to heat the incoming supply fluid that passes into the magnet through tubing 35. The return fluid from the heat exchanger exits through fitting 37 into tubing 43 and is subsequently discharged.

The above temperature control embodiments were described as cooling units. The teachings of this invention also have utility for heating. For example, referring to FIG. 1, load 13, instead of being a heat source, may be a cold unit that must be heated and maintained at a constant elevated temperature. This may be done if the temperature of the supply fluid is higher than the required elevated temperature of the unit 13. Then the heat exchanger 10 cools the supply fluid as the temperature of the return fluid is lower than the temperature of the water at means 21.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A temperature control system for providing a constant temperature supply fluid to an apparatus comprising: a single loop employing a single fluid forming a main fluid line, said loop having an input line carrying the fluid to such apparatus, and a return line carrying the fluid from such apparatus, said return line being thermally coupled to said input line thereby providing a regenerative heat exchanger; a bypass branch coupled to one of such lines whereby the lines may be thermally decoupled; a temperature sensing means coupled to the input line located between the heat exchanger and the apparatus; and means responsive to the temperature sensing means for diverting fluid between said bypass branch and the one of such lines coupled to said bypass branch.

2. A temperature control system as claimed in claim 1 including a constant flow regulator located in the main fluid line.

3. A temperature control system as claimed in claim 1 wherein said fluid diverting means is an electrically controllable valve.

4. A temperature control system as claimed in claim 1 wherein said heat exchanger comprises two fluid-carrying tubes, one tube being concentrically disposed within the other, one of said tubes forming said input line and the other of said tubes forming return line.

5. A temperature control system as claimed in claim 4 wherein said two concentric tubes are spirally wound to form a flat compact heat exchanger.

6. A temperature control system as claimed in claim 1 including a flow regulator located in the main fluid line, and means for controlling said flow regulator to regulate the rate of flow in said main line in accordance with the temperature of the fluid in said line.

7. A temperature control system as claimed in claim 6 wherein said means for controlling said flow regulator includes a temperature sensitive means positioned in the main fluid line between said return line and the apparatus.

References Cited by the Examiner

UNITED STATES PATENTS

| 2,236,087 | 3/41 | Detwiler | 236—18 |
| 2,254,917 | 9/41 | Schroder | 165—35 |
| 2,288,599 | 7/42 | Ramsaur | 165—37 |
| 2,410,912 | 11/46 | Wenk | 165—154 X |
| 2,587,815 | 3/52 | Branson | 236—99 |

FOREIGN PATENTS

| 570,638 | 9/58 | Belgium. |
| 70 | 1869 | Great Britain. |
| 637,051 | 5/50 | Great Britain. |

CHARLES SUKALO, *Primary Examiner.*

ALDEN D. STEWART, *Examiner.*